United States Patent [19]
Daroux et al.

[11] Patent Number: 5,648,186
[45] Date of Patent: Jul. 15, 1997

[54] POLYMER ELECTROLYTES HAVING A DENDRIMER STRUCTURE

[75] Inventors: Mark L. Daroux, Cleveland Heights; David W. Kurz, Concord; Morton Litt, University Heights; Anastasios Melissaris, Centerville; Donald G. Pucci, Concord, all of Ohio

[73] Assignee: Gould Electronics Inc., Eastlake, Ohio

[21] Appl. No.: 659,775

[22] Filed: Jun. 6, 1996

Related U.S. Application Data

[63] Continuation of Ser. No. 243,267, May 13, 1994, abandoned.

[51] Int. Cl.$^6$ .................................................. H01M 10/40
[52] U.S. Cl. ........................... 429/192; 521/34; 526/310; 528/405
[58] Field of Search ............................. 429/192; 521/34; 526/310; 528/405

[56] References Cited

U.S. PATENT DOCUMENTS

| | | | |
|---|---|---|---|
| 4,357,401 | 11/1982 | Andre et al. | 429/192 |
| 4,690,985 | 9/1987 | Tomalia et al. | 528/405 X |
| 4,737,550 | 4/1988 | Tomalia | 528/310 X |
| 4,798,773 | 1/1989 | Yasukawa et al. | 429/192 |
| 4,888,257 | 12/1989 | Narang | 429/192 |
| 4,908,283 | 3/1990 | Takahashi et al. | 429/192 |
| 4,927,912 | 5/1990 | Speranza et al. | 528/405 |
| 5,061,581 | 10/1991 | Narang et al. | 429/192 |
| 5,473,048 | 12/1995 | Sarkar | 528/376 |

OTHER PUBLICATIONS

Title: Ionic Conductivity in Mixtures of Salts With Comb-Shaped Polymers Based on Ethylene Oxode Macromers, Cowie et al, British Polymer Journal 20 (1988) 247-252 (Month Unknown).

Articles—Denver ACS Meeting, pp. 76-87.

Title: Polynitrile-and Polyamine-Functional Poly(Trimethylene Imine) Dendrimers, Worner et al, Angew. Chem. Int. Ed. Engl. 1993, 32, No. 9.

Title: Snythesis and Properties of Novel Linear-Dendritic Block Copolymers. Reactivity of Dendritic Macromolecules Toward Linear Polymers, Gitsov et al, Macromolecules 1993, 26 5621-5627.

Title: New Challenges in Biomaterials, Peppas et al, Science vol. 263, Mar. 25, 1994.

Title: PEO Star Molecules: Methods of Immobilization and Potential Applications, E. W. Merrill, PEO and Blood Contact, pp. 217-220.

Title: A New Class of Polymer Electrolytes Based on Chain-Extended Polyepoxides and LiClO$_4$, Marchese et al, Electrochimica Acta vol. 37 No. 9, pp. 1559-1564, 1992 (Month N/A).

Title: New Monomers and Polymers, edited by Culbertson et al, Plenum Press, New York and London, 1983 (Month N/A).

Title: Complex Formation of Poly(Ethylenimine) With Sodium Triflate and Conductivity Behavior of the Complexes, Harris et al, Macromolecules 1986, 19, 987-989 (Month N/A).

Abstract No. 1788: Synthesis and Properties of New Polymer Electrolytes, Wnek et al, p. 2439 (Date Unknown).

*Primary Examiner*—Stephen Kalafut
*Attorney, Agent, or Firm*—Michael A. Centanni

[57] ABSTRACT

Polymers, oligomers or copolymers, having a dendrimer structure and containing electronegative heteroatoms, such as etheric oxygens, capable of complexing with cationic species, for use in ionically-conductive polymeric electrolytes, Relatively high ambient conductivity is a feature of such electrolytes.

31 Claims, 9 Drawing Sheets

$d \ll \ell$

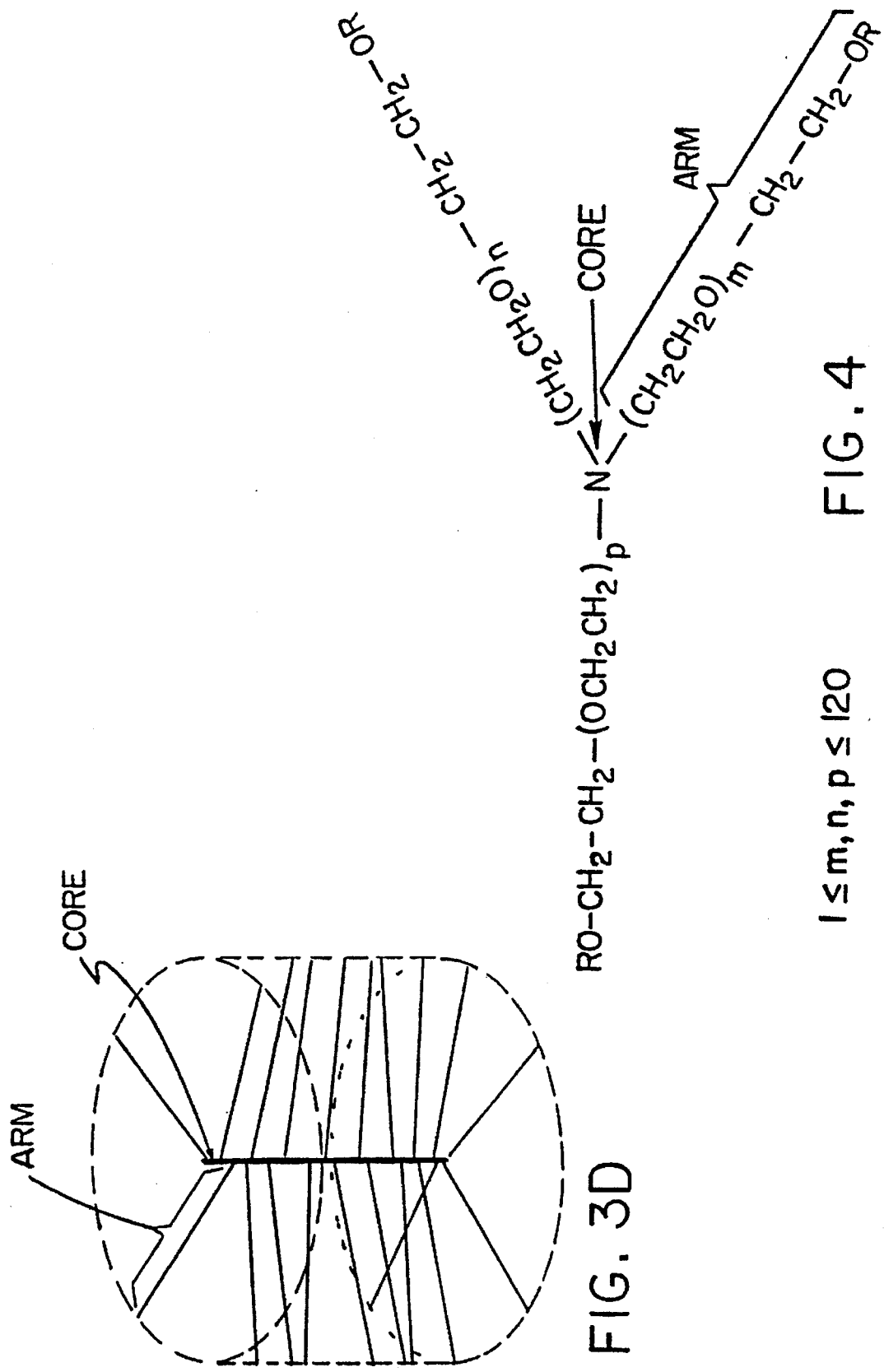

$1 \leq n \leq 120$

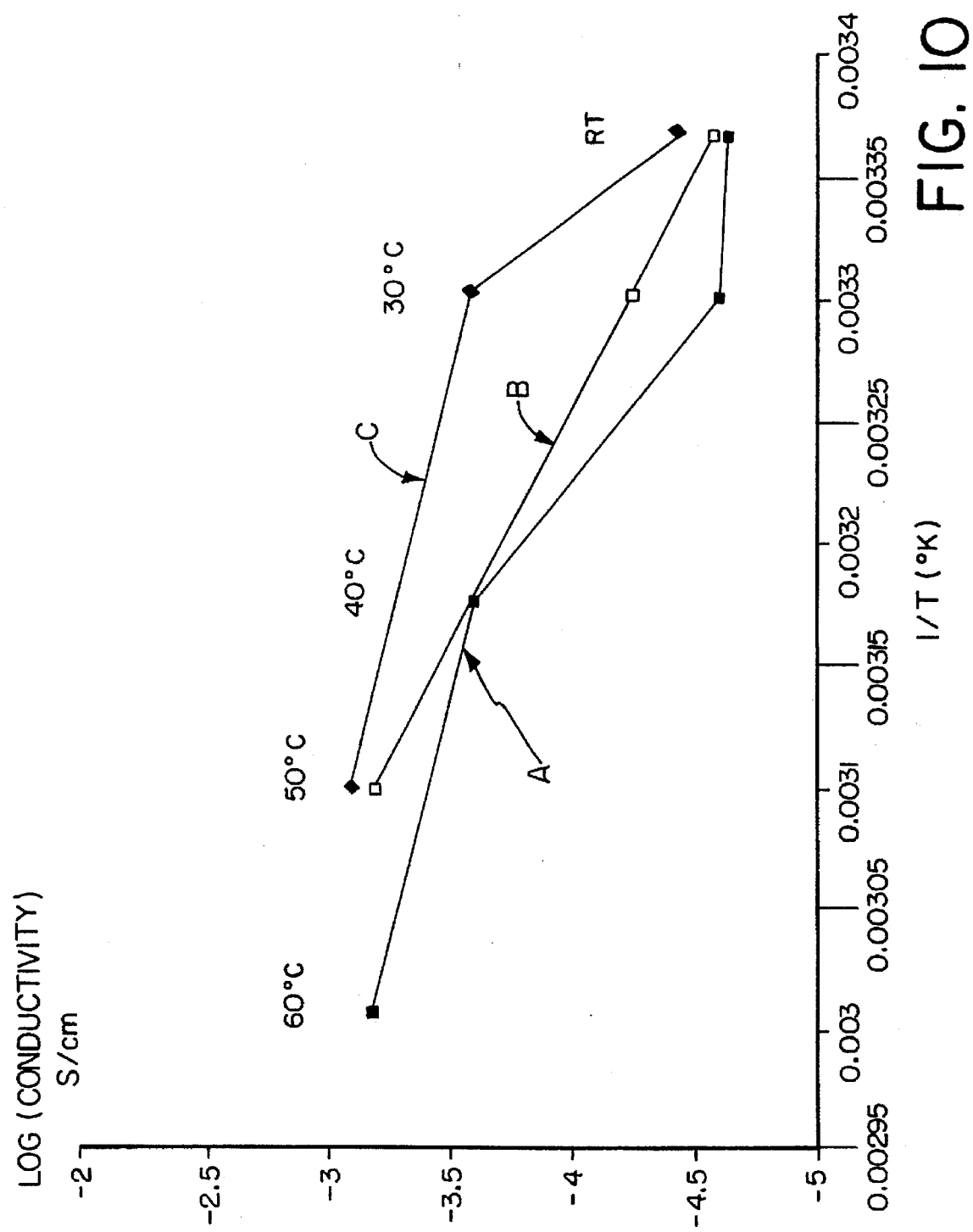

POLYMER ELECTROLYTES HAVING A DENDRIMER STRUCTURE

This application is a continuation of application Ser. No. 08/243,267 filed on May 13, 1994 now abandoned.

FIELD OF THE INVENTION

The invention relates to the use of macromolecular species having a dendrimer structure in polymer electrolytes to improve the properties of the latter, including the ambient temperature ionic conductivity. This makes them particularly suitable for applications in polymer electrolyte cells and other electrochemical devices. It also relates to a number of novel macromolecular materials having dendrimer structures.

BACKGROUND OF THE INVENTION

Since the report on the ionic conductivity of a poly (ethylene oxide)—alkali metal salt complex, there has been considerable interest in ion conducting polymers. Particular attention has focused on the possibility of using such polymers as components of solid electrolytes in high energy density batteries, such as lithium batteries as reported by M. B. Armond et al., "Fast Ion Transport in Solids", North Hollow, N.Y. (1979). In comparison with the electrolytes based on polar aprotic organic liquids that are conventionally used in such batteries, as disclosed, for example, by G. Blomgren in "Lithium Batteries", Chapter 2, Academic Press (London) 1983, it has been proposed that polymer-based electrolytes might offer some or all of the following advantages:

Increased safety

Lower vapor pressure and enhanced thermal stability

Reduced corrosion and lower reactivity with active electrodes such as lithium.

Superior mechanical properties, such as dimensional stability and/or compliance, that yield handling and mechanical advantages in processing and manufacture, and increased durability in use.

The reduction or elimination of electrolyte leakage

In seeking to find polymer-based electrolytes that embody some or all of the potential advantages listed above, and with ambient temperature conductivities approaching those of the conventional liquid electrolytes, investigators have surveyed a large number of suitable organic monomers, preferably containing at least one polar group or atom capable of complexing with the cation(s) of the electrolyte salt(s) (e.g. alkali metal ions). When polymerized, these compounds form polymers suitable for use in electrolyte compositions. Suitable organic polymeric matrices that are generally known in the art are organic homopolymers obtained by the polymerization of a suitable organic monomer as described, for example, in U.S. Pat. No. 4,908,283 or copolymers obtained by polymerization of a mixture of organic monomers. Suitable organic monomers or polymers include, by way of example, ethylene oxide, propylene oxide, ethyleneimine, polyepichlorohydrin, poly(ethylene succinate), and an acryloyl-derivatized poly(alkylene oxide) containing an acryloyl group of the formula $CH_2$=CR'C(O)O— where R' is hydrogen or lower alkyl having from 1 to 6 carbon atoms.

Polymers proposed for use in polymer electrolytes, and more specifically as the basis for solid polymer electrolytes, are described in many publications. A number of such electrolytes are described in papers presented at the Third Int. Symposium on Polymer Electrolyte, reported in *Electrochim. Acta* 37(9), 1992 ed. M. Armand and A. Gandini. Polymers used have ranged from polyethers such as PEO or PPO to comb polymers, for example having backbones comprising highly flexible polyphosphazenes to which short-chain polyether groups have been attached.

The Electrochemical Society, Inc. publication, Volume 93-1, May 16 to 21, 1993 recites on page 2439 an abstract titled "Synthesis And Properties of New Polymer Electrolytes". The abstract refers to the preparation of functional polymer electrolytes including polymers having multiple functionality ion complexing sites, redox-active sites and immobilized anions, perhaps strategically placed as pendants or at chain ends.

U.S. Pat. No. 5,294,501 discloses a siloxane acrylate monomer and solid electrolyte derived by the polymerization thereof. Specifically, the disclosure is directed to siloxane acrylate and to a single phase solvent-containing solid electrolyte having repeat units derived from siloxane acrylate incorporated into the solid polymeric matrix of the solid electrolyte. An electrolyte cell that incorporates the electrolyte is also disclosed.

U.S. Pat. No. 5,061,581 disclosed an amorphous ionically conductive macromolecular solid having improved ambient temperature ionic conductivity. The solid comprises a solid solution of at least one positively charged ionic species dissolved in a macromolecular material, the macromolecular material comprising a polymer or copolymer having mostly a polyether structure. Some of the repeat units have the oxygens replaced with S or NR wherein R includes at least one basic site capable of associating with positively charged ionic species and has two to ten carbon atoms in the backbone.

To date, there are still problems limiting the use of polymer electrolytes in high energy density batteries (e.g. lithium—solid polymer electrolyte cells), most particularly in obtaining sufficient ambient temperature conductivity to permit attractive power densities (>100W/l). For example, some of the most promising electrolytes are those based on poly(ethylene oxide)-salt complexes. PEO has shown good stability, a wide electrochemical stability window, and exhibits good solvating power for alkali-metal salts. The ambient temperature conductivities, however, are limited by the tendency of PEO-salt complexes to form crystalline phases. Since these phases have substantially lower conductivity than the amorphous material, the overall conductivity is reduced.

One of the approaches commonly used to improve the conductivity of PEO and other polymer complexes is to incorporate plasticizers (solvents) in the polymer electrolyte. These materials may reduce or eliminate the crystallinity in the polymer matrix and/or enhance the solubility of the salt. Suitable solvents are typically polar aprotic organic liquids, and among those well-known in the art are propylene carbonate, ethylene carbonate, γ-butyrolactone, tetrahydrofuran, dimethoxyethane (glyme), diglyme, triglyme, tetraglyme, dimethylsulfoxide, dioxolane, sulfolane and the like. Other plasticizers that have been reported are oligomeric or low molecular weight polymeric materials such as poly(ethylene glycol).

In order to obtain significant improvement in conductivity (sufficient to approach that of liquid electrolytes), significant fractions (on the order of 20 weight percent or more) of such plasticizers are typically incorporated into the polymer electrolyte. At these concentrations, there is usually a degradation of the desirable mechanical properties and dimensional stability of the polymer matrix. Also the reactivity of the plasticizer will have a strong influence on the overall chemistry of the electrode, thereby negating some of the desired advantages postulated for all-polymer electrolytes.

It is an objective of the present invention to provide novel macromolecular materials having dendrimer structures which can be advantageously employed as a component of an electrolyte composition for application in electrochemical devices. By way of example, electrolytes formulated using the dendrimer structured materials of the invention, may have improved chemical and thermal stability and reduced volatility in comparison with conventional polar aprotic organic-liquid-based electrolytes.

Another objective of the invention is to provide a means of obtaining polymer electrolytes that are completely or predominantly amorphous at room temperature without requiring that a substantial fraction of the total composition comprise relatively low molecular weight organic solvents or plasticizing anions. By way of example, electrolytes formulated using the dendrimer- structured macromolecular materials of the invention may have higher room temperature ionic conductivity than conventional solvent-free polymer electrolytes, at least partially because of reduced crystallinity.

Another object of the present invention is to provide a novel polymeric macromolecular material having good conductivity properties so that it can be easily assembled as a component of a solid electrolyte cell.

The foregoing and additional objects will become more fully apparent from the following description.

SUMMARY OF THE INVENTION

The invention relates to polar macromolecular materials with dendrimer structures which can be used in the formation of electrolytes for use in electrochemical devices, including energy storage devices (such as batteries and capacitors), ion sensors and display devices. In its simplest form, said electrolyte contains dissolved ionic species held in a dissociated form in the polymeric matrix of the macromolecular material, such that at least one of the ionic species is mobile and capable of carrying charge, but the system may be much more complicated and comprise a variety of ionic species, polymeric and nonpolymeric materials, additives and modifiers, and in which the material of the invention can be only a minority component, or an additive. In its preferred form the electrolyte is wholly or mostly comprised of the dendrimer material containing ionic species (salt). The material of the invention, besides having a dendrimer structure, should also comprise polar species capable of solvating at least one of the ionic species of the electrolyte and preferably solvating ionic species per polymer repeat unit. In its preferred form for application in high energy batteries, it will contain electronegative heteroatoms capable of complexing with alkali-metal ions and in its most preferred form with lithium ions. Such electronegative heteroatom units will preferably be oxygen, nitrogen, sulfur, phosphorus or siloxanes or mixtures or alloys thereof.

Some terms used in this application are as follows:

Repeat Unit—the repeat unit is usually equivalent or nearly equivalent to the monomer or starting material from which the polymer is formed. Usually the smallest unit that can be defined which identifies the chemical content of a polymer in a way similar to that in which the unit cell of an inorganic crystal defines its macromolecular structure.

Degree of Polymerization (DP)—The length of the polymer chain is specified by the number of repeat units—DP. Analogous to beads on a string necklace—the length of the necklace can be defined by the number of beads on the string. In this application, the DP is a calculated average based on the assumed stoichiometry of the synthesis reactions.

Polymer—A polymer is a large molecule built up by the combination of small, relatively simple chemical units. In some cases the combination is linear, much as a chain is built up from its links. In other cases, the chains are branched, or interconnected to form three-dimensional networks.

Oligomer—A polymer with a low DP, usually between 2 and 100. Oligomers are below the molecular weight cutoff where higher molecular weight polymers begin to have superior properties.

Branched polymer—Conventionally, a polymer with a linear backbone with chains attached periodically. More generally, a polymer containing one or more branch points. Oligomers may also be branched.

Branch point—The portion of a branched polymer comprising an atom to which three or more polymer chains are attached.

Dendrimer—A general type of branched polymer, comprising a number of polymeric arms radiating from a central core.

Star dendrimer—Dendrimer where each chain radiating from the core on a polymer molecule is linear (i.e. is not branched further).

Starburst dendrimer—Dendrimer where the arms are further branched, i.e. where each linear section of polymer has branch points at both ends except for the chain terminators. These dendrimers can be synthesized "generationally".

Arm segment—A linear region of polymer chain comprising an arm of a branched polymer. It lies between two branch points, or between a branch point and a termination of the chain or arm.

Cross-linked polymers—Polymeric materials comprising monomers, oligomers and/or polymers interconnected into a three-dimensional network.

GPC—Gel Permeation Chromatography, an analytical technique to determine molecular weights and molecular weight distribution of polymers.

Morphology—Form and microstructure of substances.

Gel—Polymer swollen with solvent to produce a semisolid gelatinous material.

Free volume—Microscopic "unoccupied" or empty holes in amorphous polymers which strongly influence bulk properties such as viscosity.

Steric Strain—The approach of two or more atoms not bonded to each other to a position where repulsions occur due to electron cloud electrostatic interactions.

Macromolecule—Molecule with very large molecular weights (>10,000) whose structure may be repetitive as with a polymer or can be non-repetitive as with a protein.

Ionic conductivity—Transfer of charge by transport of cations or anions (not electrons).

Electrolyte—Used in this patent as a material which allows ionic conductivity.

Polymer/salt complex—Structure where a salt is bound by several sections of a polymer via induced dipole forces.

Mechanical properties—Physical properties which predict performance in engineering applications, such as hardness, and elasticity.

Hetero atom—Atom other than carbon which can be included in a polymer backbone.

Polymer degradation—chemical reaction of a polymer that results in a lowering in mechanical properties.

The essence of the invention, and the distinguishing feature from earlier disclosed polymer electrolytes, lies in the morphologically unique dendrimer structure. The dendrimers of the invention are defined as molecular constructions having a branched structure in which at least three polymeric arms are attached to a core, and extend radially away from it. The arms may be linear, simple or star dendrimers as shown in FIG. 1, or may themselves be further branched, for example, starburst dendrimer as shown in FIG. 2 or even comprise closed branched structures such as loops. The arms are composed of segments, which are defined as any linear section between branch points (or extending out from a single branch point in the case of a linear or unbranched arm). Together the arms comprise the major part of the mass of the polymer and dominate its properties.

Dendrimers may be distinguished from other types of branched polymers in that:

(a) The arms are long with respect to the size of the core. The ratio of the mean molecular weight of individual arms to the molecular weight of the core should be greater than or equal to one.

(b) The arms are relatively closely spaced on the core. The mean number of polymer repeat units in the case of polymeric cores (or backbone atoms where the core is not polymeric), per branch point on the core should be less than or equal to 25, preferably between 1 to 20 and most preferably between 1 and 4.

(c) The material is relatively highly branched. The mean number of polymer repeat units in the arm segments (i.e., between branch points) should not exceed 500, preferably being less than 150, most preferably less than 50, preferably more than 4, more preferably more than 10 and most preferably more than 20.

There is no implication of regularity of structure beyond the definitions above; the arms may differ in length, and/or in structure and/or in spacing on the core. Further, the arms may be a mixture of linear and branched structures. Structures with arms of various chemical composition and/or differing terminating groups fall within this definition.

The core material may comprise any organic (aromatic or aliphatic) or inorganic material with three or more functional groups to which dendrimer arms can be attached, or from which they can be grown. Arms may be attached or grown by any of the means known in the chemical field, including nucleophilic, electrophilic, free-radical, and ring opening reactions. Examples of materials containing functional groups that can be used as nucleophiles in nucleophilic reactions are N-H containing materials such as ammonia, amines and polyamines, hydroxyl containing materials such as polyols, polysaccharides, poly(serine), or polyglycerine; thiol containing materials such as polythiols. Examples which can be used as nucleofugal groups in nucleophilic reactions are compounds containing three or more halogens, tosylates, or other commonly used leaving groups.

The dendrimer arms may consist of linear organic (aromatic or aliphatic) or inorganic oligomers or polymers that contain polar entities such as electronegative heteroatoms which can solvate cations. Examples of suitable heteroatoms include, but are not limited to, sulfur, nitrogen, phosphorus, or oxygen. The number of atoms connecting the heteroatoms can vary from one to twenty. The connecting atoms can consist of any material which can form oligomers such as carbon, silicon, phosphorous, and the like. The arms can contain pendant groups, grafts, or blocks of oligomers which do not solvate ions and could consist of any material, organic (aromatic or aliphatic) or inorganic which can form oligomers or polymers. The arms may be linear, lightly branched, highly branched, or cross-linked and preferably at least one of the arms should contain at least one further branch and contain at least two branch points. In one embodiment, at least one arm contains at least two branch points. Alternatively, the arms can consist of linear sections of polymeric material or polymer chains consisting of any material, organic (aromatic or aliphatic) or inorganic, that can form linear or branched oligomers or polymer to which pendant groups or grafts can be attached. In this case the pendant groups or grafts should contain heteroatoms as previously described which can solvate ions. The pendant group or graft containing arms may be linear, lightly branched, highly branched, or cross-linked.

Also included in this invention are compositions in which the dendrimer structures are components of a block copolymer, and these may also exhibit the desirable properties of this invention. Also included in this definition are species in which any of the dendrimer polymers or oligomers as described above contain intra and/or inter molecular crosslinks. This may be for the purpose, for example, of modifying the mechanical properties or the chemical stability of the electrolyte. Crosslinking could also be used to further reduce the crystallinity of the electrolyte, to modify the solubility in or for solvents, and to permit the fabrication of highly-solvent-swollen gel electrolytes. The dendrimers may be non-cross-linked, lightly cross-linked or interconnected, highly cross-linked, or any other amount of cross-linking. The cross-linking agent may be any substance which can react with two or more of the dendrimer arms, arm ends, arm pendant groups or with the cores.

Although not bound by theory, it is believed that the dendrimer morphology offers advantages over linear macromolecules with the same or similar repeat units because of the constraints imposed at at least one end of the dendrimer arm segments. This constraint, together with the effect of steric crowding which can also be thus induced, inhibits the polymer chains from packing in their thermodynamically preferred conformation for crystallization, and thereby lowers their melting point because of entropic factors. This effect is even more pronounced for the electrolyte; perhaps because the formation and crystallization of the solvated ionic species or polymer-salt complexes are even more sensitive to steric and entropic effects. By controlling the structure of the dendrimer, for example for suitable ratios of segment length to branch multiplicity, the free volume available to the chain ends can be made relatively large. At the chain ends, this may facilitate segmental motion and/or solubility of the ions, thus increasing the conductivity of the electrolyte.

It has been proposed that the tendency of polymer electrolytes based on PEO, PPO and the like to crystallize at ambient temperatures could be avoided or reduced by using comb structured polymers. Polyether chains that are too short to crystallize are attached to a flexible polymer backbone, e.g. polyphosphazene, to form the so-called comb polymers.

The dendrimers of the invention differ from comb structures in that the essence of the comb idea is that the side-chains, which are responsible for the ion solution, are short. See for example L. Marchese et al., *Electrochim. Acta* 37, 1559 (1992) which disclosed that the room temperature conductivity reaches a maximum at approximately five EO units in the side chain of a comb polymer based electrolyte so that there is no advantage, and perhaps even a disadvantage, in having side arms much longer than this. It is taught that the backbone in contrast should be long to generate desirable mechanical properties. In the dendrimers of the invention the arms are long with respect to the core. In the limit, the core may be a single atom (e.g. C, N, Si). Thus, the idealized geometry of a comb would approximate a ribbon as shown in FIG. 3A, while that of a dendrimer would approximate a sphere as shown in FIG. 3B. Both approaches in practice might produce compounds with structures having approximately cylindrical geometry, but the comb polymer would yield a cylinder that had an axis that was long compared to its diameter as shown in FIG. 3C, while the dendrimer polymer would yield a cylinder with an axial length equal to or less than its diameter as shown in FIG. 3D.

The dendrimers of the present invention differ from stars and dendrimers of the prior art in structure and synthesis. They are poly(ethylene imine) dendrimers derivatized by growing ethylene oxide arms in a simple, one-pot synthesis. Both poly(ethylene imine) dendrimers and ethylene oxide are readily available, inexpensive reagents. The segment length is much longer than dendrimers previously synthesized and can be easily varied to almost any length. Also, the segment length is not constant but has a length distribution that can be manipulated by changing reaction conditions. The chain ends consist of alkoxides. The core, arm, and branch points are completely aliphatic.

Experimental observations seem to indicate that the effect of tying one end of a chain at the core extends outward for a relatively large number of repeat units, at least 100 in the case of linear poly(ethylene oxide) arms. Thus, very highly branched structures may not be required to obtain the benefits of this invention. This is desirable since it simplifies the number of synthetic steps necessary to produce useful materials and thereby reduces their likely cost.

It should further be noted that although the illustrative diagrams shown in this section and in the examples following depict idealized perfect molecules, the advantages of this invention do not require this degree of perfection. As long as the polymeric chains comprising the arms of the dendrimer are anchored at at least one end, preferably with some degree of steric crowding, then the advantages of the invention would be obtained. Thus, the examples given in the next section, which illustrate these advantages, have been obtained with polymers prepared according to the syntheses given and which undoubtedly contain defects; for example in practice there is probably less than the maximum degree of branching which is depicted in the structural formulae given herein. It is not implied that the given syntheses produce such idealized structures which are shown for illustrative purposes, nor that a high degree of perfection is necessary.

One embodiment of the invention relates to an ionically conductive amorphous polymeric electrolyte for use in electrochemical cells comprising a solution of at least one positively charged ionic species (salt) dissolved in a polymeric macromolecular material, said polymeric macromolecular material comprising an oligomer, polymer or copolymer having a branched dendrimer structure comprising a polymeric or non-polymeric core with at least three linear polymeric arms attached to and extending from said core with the ratio of the mean molecular weight of the arms to the molecular weight of the core being at least one, preferably at least 2, and the number of polymer repeat units per branch points on the core being less than 25, preferably between 1 and 20 and most preferably between 1 and 4. At least one of the arms may be further branched to form a starburst dendrimer structure or a closed branched dendrimer structure and the mean number of polymer repeat units between branch points is 500 or less. The polymeric macromolecular material could contain electronegative heteroatoms, such as etheric oxygens, which are capable of associating with the cationic species of the salt thereby making it an ideal component of a solid electrolyte for use in solid electrolyte cells.

To produce an electrolyte for use in electrochemical cells charged species are introduced, typically by dissolving a salt in the polymeric material of the invention. The salt will comprise a positively charged ionic species (cation) such as the lithium ion, and an anion which may, for example be I–, $ClO_4^-$, $SCN^-$, $BF_4^-$, $PF_6^-$ or $CF_3SO_3-$. Other suitable salts are $AsF_6^-$, specifically imide, other halides, and others known in the art. Optionally, a solvent or plasticizer could be added to enhance the solubility of the ionic salt in the polymeric electrolyte, and by this means and otherwise to enhance the conductivity of the electrolyte, particularly at low temperatures. Suitable solvents well known in the art for use in non-aqueous batteries include, by way of example, propylene carbonate, ethylene carbonate, n-methylpyrolidone, methylformate, γ-butyrolactone, tetrahydrofuran, glyme (dimethoxyethane), diglyme, tetraglyme, polyethylene glycols, dimethyl sulfoxide, dioxolane, 2Me-THF, dimethyl carbonate, diethyl carbonate and the like with the molecular weight preferably being 4,000 or less.

Suitable dendrimers for use in this invention can consist of core material containing 3 to 100 hydroxyls, without being limited to such as polyols or saccharides, or 3 to 100 thiols, or amines or polyamines containing 3–100 N-H groups which can react to form 3 to 100 arms consisting of linear poly(ethylene oxide) and/or poly(ethylene sulfide). Preferably, the arm length can vary from DP=4 to DP=120. Branch points can be introduced by converting chain end to diols or dithiols, for example, by many means well known in the art, for example by reaction with bromopropanediol, or by reaction with epichlorohydrin and subsequent hydrolysis.

Cross-linking can be accomplished by many means well known in the art, as for example by reaction of the hydroxyl or alkoxide ends with di, tri, or multifunctional cross-linking agents known to react with these groups. Examples would include dibromo, diiodo, or dichloro containing organic (aromatic or aliphatic) compounds, diisocyanates, triisocyanates, diepoxides, acid halides, multifunctional epoxides, dianhydrides, trianhydrides, diacids, or triacids.

BRIEF DESCRIPTION OF THE DRAWING

FIGS. 3B and 3D are examples of dendrimer structures.

FIG. 4—Dendrimer structure of ethoxylated triethanolamine where R can be H, $CH_3$, Li Na or the like and DP is from 1 to 120 (i.e., $1 \leq n$, m, p <120).

FIG. 10—Graph of conductivity versus temperature for a macromolecular material (Example 14) of this invention mixed with LiClO$_4$ (in the ratio of 1 lithium to 10 etheric oxygen atoms)—curve A, and with the further addition of 1:3 propylene carbonate: ethylene carbonate plasticizer in the amount of 3% (Curve B) and 10% (Curve C).

EXAMPLES OF DENDRITIC SYNTHESIS

Figure 1:
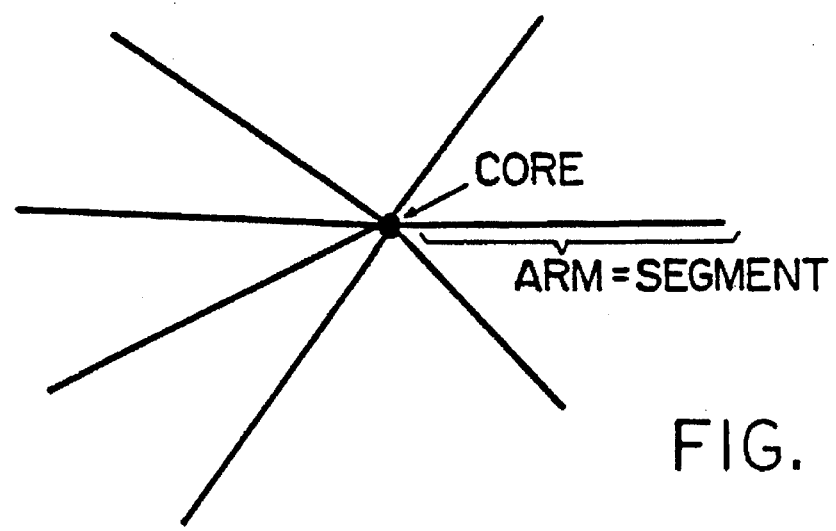
FIG. 1 is an example of a star dendrimer structure of this invention.
Figure 2:
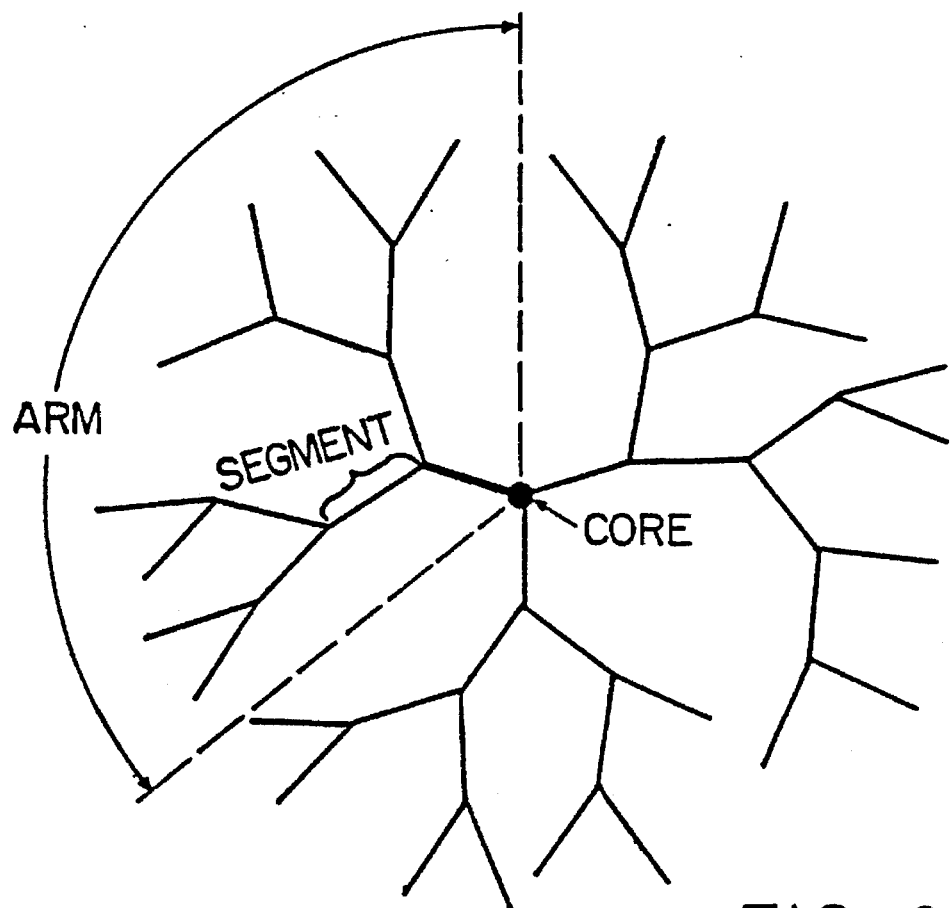
FIG. 2 is an example of a starburst dendrimer structure of this invention.
Figure 3A:
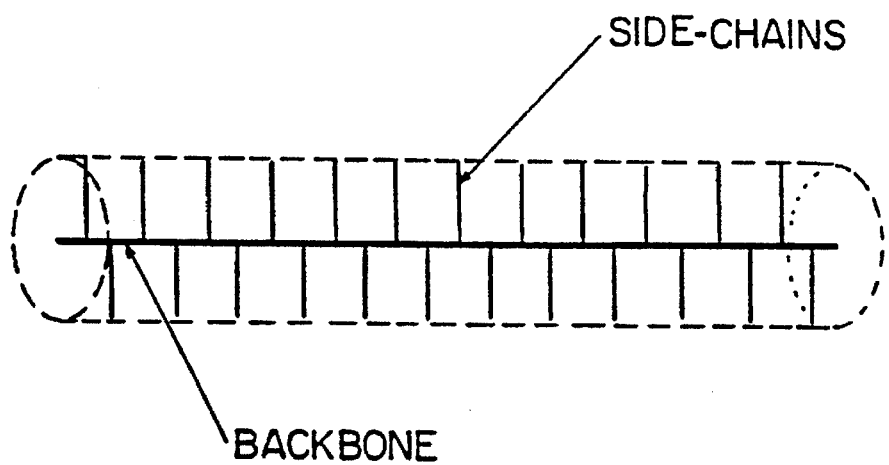
FIGS. 3A and 3C are examples of comb structures.
Figure 3B:
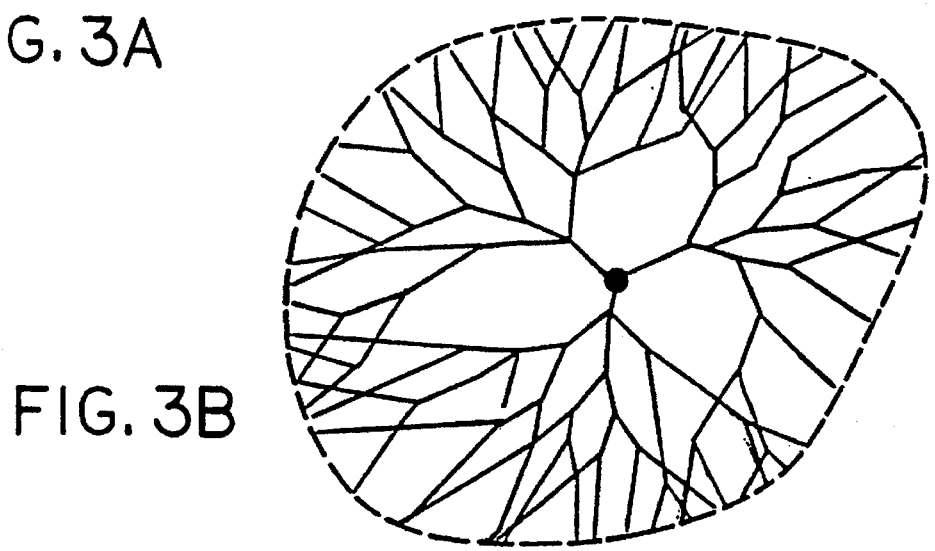
Figure 3C:
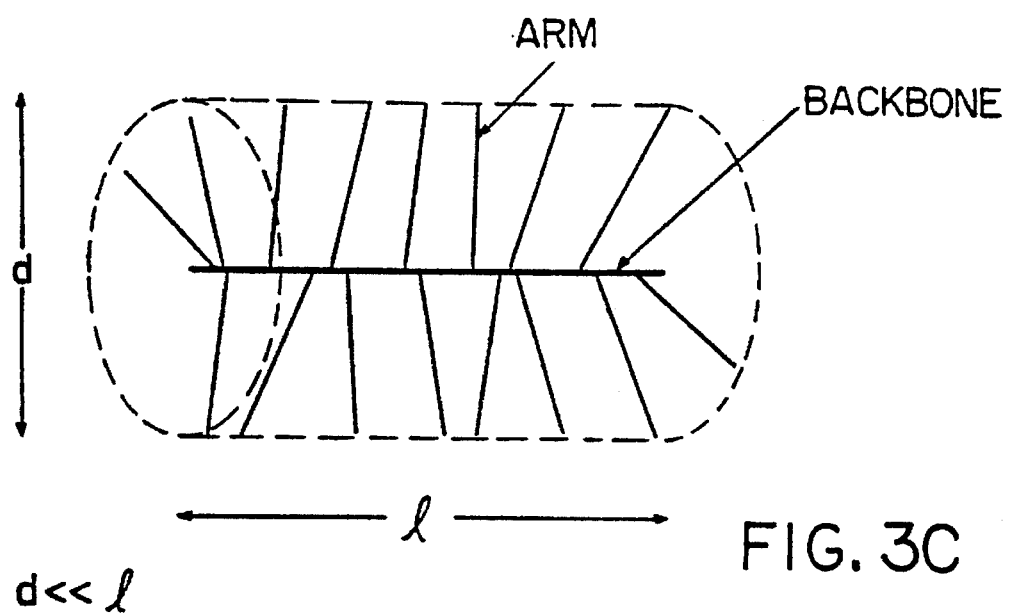

1. Reaction Of Tetraethylenepentamine With Ethylene Oxide

Tetraethylenepentamine (18.9 g, 100 mmol) was placed into dimethyl acetamide (DMAC) (100 ml) in a 100 mL graduated cylinder with magnetic stirring. A glass tube with a fitted glass purge end was inserted into the liquid and the other end attached to a tank of ethylene oxide. Ethylene oxide was bubbled into the liquid at a rate of one bubble per two seconds to produce a monoethoxylated derivative. The apparatus was weighed periodically to monitor the progress of the reaction. After seven days of reaction, the reaction was approximately 100% complete.

2. DP=7 Dendrimer Synthesis

Sodium hydride (1.63 g., 70.9 mmol) was added to DMAC (100 ml) and the product reaction of Example 1 (49.0 g, 99.4 mmol). The mixture was sealed in a Parr pressure reactor and connected with a lecture bottle of ethylene oxide (212 g, 4.82 mol). The reactor was cooled with dry ice, then ethylene oxide was added until equilibrium. The reactor was allowed to warm to room temperature and the pressure increased up to 2 atm. Upon shaking the vessel, the pressure dropped immediately to nearly zero, indicating fast reaction. This addition step was repeated many times over a five day interval until the gas cylinder was empty resulting in a viscous solution.

3. DP=13 Dendrimer Synthesis

Sodium hydride (0.27 g, 11.3 mmol) was added to DMAC (20 ml) and the product of the reaction in Example 2 (55.0 g, 17.8 mmol). The mixture was sealed in a Parr pressure reactor and connected with a lecture bottle of ethylene oxide (35 g, 0.79 mol). The reactor was cooled with dry ice, then ethylene oxide was added until equilibrium. The reactor was allowed to warm to room temperature and the pressure increased up to 2 atm. Upon shaking the vessel, the pressure dropped immediately to nearly zero, indicating fast reaction. This addition step was repeated many times over a two day interval until all of the ethylene oxide had been added. The vessel was heated at 60° C. overnight resulting in a light tan material.

4. DP=40 Dendrimer Synthesis

Sodium hydride (0.295 g, 12.2 mmol) was added to tetrahydrofuran (40 mL) and the product of the reaction in Example 3 (71.0 g, 11.62 mmol). Liquid ethylene oxide at −16° C.(100 g, 2.27 mmol) was added after the reactor was cooled with dry ice. The mixture was sealed in a Parr pressure reactor. The reactor was allowed to warm to room temperature and the vessel periodically shaken until the pressure dropped to nearly zero. The reactor was heated at 50° C. for 24 hours and the solvent was removed resulting in a brown solid (mp=42° C.).

5. DP=40 Dendrimer Synthesis

Sodium hydride (1.4 g, 58.0 mmol) was added to DMAC (100 mL) and ethoxylated poly(ethylene imine) (MW= 2000) (5.0 g, 57.47 mmol of hydroxyls). Liquid ethylene oxide at −16° C. (100 g, 2.27 mmol) was added after the reactor was cooled with an ice bath. The mixture was sealed in a Parr pressure reactor and allowed to warm to room temperature resulting in pressures up to 2 atm and the vessel periodically shaken for twenty four hours. The reactor was heated at 50° C. for several days until the pressure was below 1 atm. The resulting brown liquid was precipitated into ethyl ether (250 mL) resulting in a white powder (93.3 g, 87.9% crude yield, mp=41° C.).

6. DP=40 Dendrimer Synthesis

Sodium hydride (1.4 g, 58.0 mmol) was added to DMAC (100 mL) and ethoxylated poly(ethylene imine) (MW= 2000)(5.0 g, 57.47 mmol of hydroxyls). Liquid ethylene oxide at −16° C. (100 g, 2.27 mmol) was added after the reactor was cooled with an ice bath. The mixture was sealed in a Parr pressure reactor and allowed to warm to room temperature resulting in pressures up to 2 atm and the vessel periodically shaken for twenty four hours. The reactor was heated at 50° C. for several days until the pressure was below 1 atm. The resulting brown liquid was precipitated into ethyl ether (250 mL) resulting in a white powder (95.3 g, 90.7% crude yield, mp=40° C.

7. DP=80 Dendrimer Synthesis

Sodium hydride (0.7 g, 87.0 mmol) was added to DMAC (100 mL) and ethoxylated poly(ethylene imine) (MW= 2000) (7.5 g, 86.22 mmol of hydroxyls). Liquid ethylene oxide at −16° C. (100 g, 2.27 mmol) was added after the reactor was cooled with an ice bath. The mixture was sealed in a Parr pressure reactor and allowed to warm to room temperature resulting in pressures up to 2 atm and the vessel periodically shaken for twenty four hours. The reactor was heated at 50° C. for several days until the pressure was below 1 atm. The resulting brown liquid was precipitated into ethyl ether (300 mL) resulting in a white powder (89.1 g, 87.0% crude yield, mp=44° C.).

8. DP=80 Dendrimer Synthesis

Sodium hydride (2.1 g, 29.0 mmol) was added to DMAC (100 mL) and ethoxylated poly(ethylene imine) (MW= 2000) (2.5 g, 28.75 mmol of hydroxyls). Liquid ethylene oxide at −16° C. (100 g, 2.27 mmol) was added after the reactor was cooled with an ice bath. The mixture was sealed in a Parr pressure reactor and allowed to warm to room temperature resulting in pressures up to 2 atm and the vessel periodically shaken for twenty four hours. The reactor was heated at 50° C. for several days until the pressure was below 1 atm. The resulting brown liquid was precipitated into ethyl ether (300 mL), redissolved in THF, then precipitated into ethyl ether (300 mL), resulting in a white powder (133.0 g, 43.3% crude yield).

9. DP=120 Dendrimer Synthesis

Figure 8:
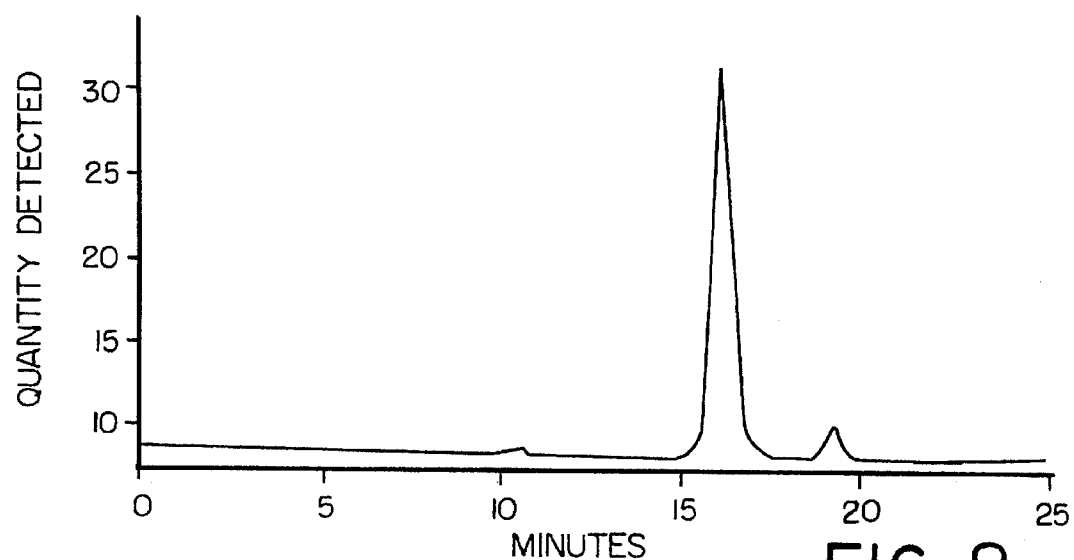
FIG. 8 is a gel permeation chromatography plot for the dendrimer material of Example 9.

Sodium hydride, Aldrich 95% (0.46 g, 19.17 mol) was added to ethoxylated polyimine MW=2000 Polysciences 99% (1.7 g, 19.16 mol of hydroxyls) in dimethyl acetamide Kodak 99% (150 mL). After the hydroxyls were converted into alkoxides, the reaction mix was cooled in an ice bath for one hour. Ethylene oxide (100 g, 2.27 mol) was cooled to −13° C., then added to the reaction mix. The mixture was sealed in a 300 mL Parr pressure reactor. The reactor was allowed to warm to room temperature with periodic agitation for 24 hours, resulting in a rise in pressure to 5 psi. After 24 hours, the reactor was heated to 50° C. for two hours resulting in a pressure of 20 psi. After cooling to room temperature, the brown reaction mixture was poured into 250 mL of diethyl ether resulting in a white crystalline precipitate. The precipitate was dried for twenty four hours under high vacuum giving a white powder (85.2 g, 83.7% yield, mp=35° C.). The molecular weight was high (over 100,000), the polydispersity (Mw/Mm) of approximately 2, and the dendrimer was relatively free of low or high molecular weight impurities as shown by GPC in FIG. 8.

10. Starburst Generation 2 Dendrimer

Sodium hydride, Aldrich 95% (1.43 g, 0.0565 mmol) was added to a ten armed PEG compound MW=10,000 Shearwater Polymers 99% (56.5 g, 0.0565 mmol of hydroxyls) in THF (200 mL). After the hydroxyls were converted into alkoxides, 3-bromo, 1,2-propanediol Aldrich 99% (8.76 g, 0.565 mmol) was added. The reaction was monitored by measuring the pH. After the reaction was complete, sodium hydride, Aldrich 95% (2.86 g, 0.113 mmol) was added. After the sodium hydride reacted, the reaction mix was cooled in an ice bath for one hour. Ethylene oxide (100 g, 2.27 mol) was cooled to −13° C., then added to the reaction mix. The mixture was sealed in a 300 mL Parr pressure reactor. The reactor was allowed to warm to room temperature with periodic agitation for 24 hours, resulting in a rise in pressure to 5 psi. After 24 hours, the reactor was heated to 60° C. (initial pressure=20 psi) for twenty four hours. After cooling to room temperature, half of the brown reaction mixture was poured into 250 mL of diethyl ether resulting in a white crystalline precipitate. The precipitate was dried for twenty four hours under high vacuum giving a white powder (62.3 g, 79.6% yield).

11. Starburst Generation 3 Dendrimer

Sodium hydride, Aldrich 95% (1.43 g, 0.565 mmol) was added to the product of the reaction of Example 10 (84.75 g, 0.565 mmol of hydroxyls) in THF (200 mL). After the hydroxyls were converted into alkoxides, 3-bromo, 1,2-propanediol Aldrich 99% (8.76 g, 0.0565 mmol) was added. The reaction was monitored by measuring the pH. After the reaction was complete, sodium hydride, Aldrich 95% (2.85 g, 0.113 mmol) was added. After the sodium hydride reacted, the reaction mix was cooled in an ice bath for one hour. Ethylene oxide (100 g, 2.27 mol) was cooled to −13° C., then added to the reaction mix. The mixture was sealed in a 300 mL Parr pressure reactor. The reactor was allowed to warm to room temperature with periodic agitation for 24 hours, resulting in a rise in pressure to 5 psi. After 24 hours, the reactor was heated to 60° C. (initial pressure=20 psi) for twenty four hours. After cooling to room temperature, half of the brown reaction mixture was poured into 250 mL of diethyl ether resulting in a white crystalline precipitate. The precipitate was dried for twenty-four hours under high vacuum giving a white powder (88.2 g, 95.6% yield).

Examples of Cross-linked Dendrimer Synthesis

12. Synthesis Of HMDI cross-linked dendrimer—DP=7

Hexamethylene diisocyanate (0.291 g, 1.7 mmol) was added slowly to the product of Example 2 (5.0 g, 2.3 mmol) held at 3° C. in THF (10 mL), resulting in an exothermic reaction. After 3 hours of stirring, a gelatinous material was evident. The product was washed with water causing approximately half of the material to dissolve. The water soluble portion appeared to be highly cross-linked while the water soluble portion is likely to be only lightly cross-linked. When dried, the water swollen insoluble material became a rubbery yellow solid.

13. Synthesis Of HMDI cross-linked dendrimer DP=40

Hexamethylene diisocyanate (0.204 g, 1.22 mmol) was added slowly to the product for Example 4 (5.0 g, 4.1 mmol) dissolved in tetrahydrofuran at −20° C., resulting in an exothermic reaction. After 1 hour of stirring at 80° C., a gelatinous light tan material was evident. The product was washed with water causing approximately half of the material to dissolve. The water insoluble portion appeared to be highly cross-linked while the water soluble potion is likely to be only lightly cross-linked. When dried, the water swollen insoluble material became a rubbery yellow solid.

14. Electrolyte

Figure 9A:
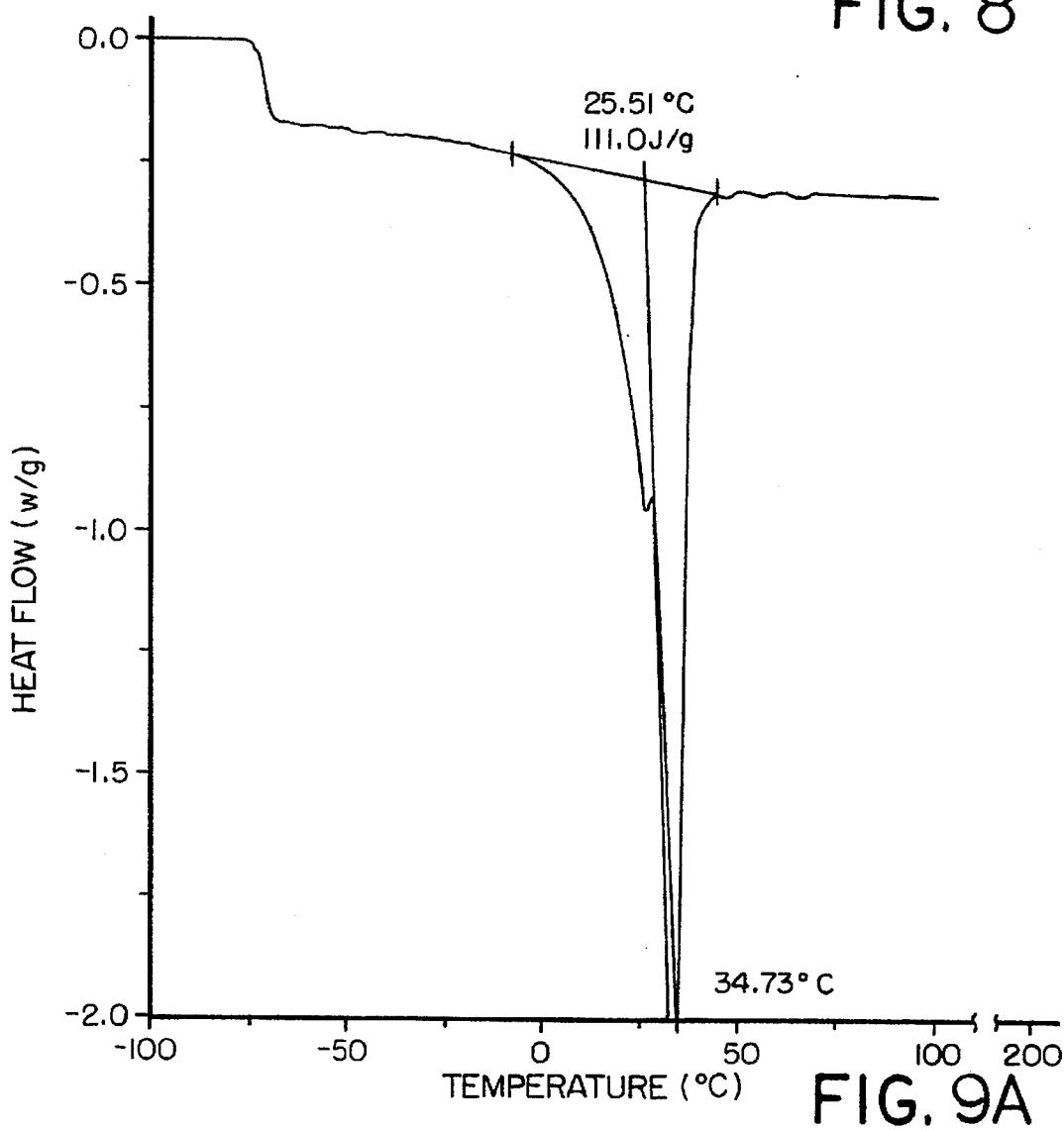
FIG. 9a is a plot of heat flow versus temperature for the electrolyte of Example 14 showing a sharp endotherm (111 J/g) at 35° C.
Figure 9B:
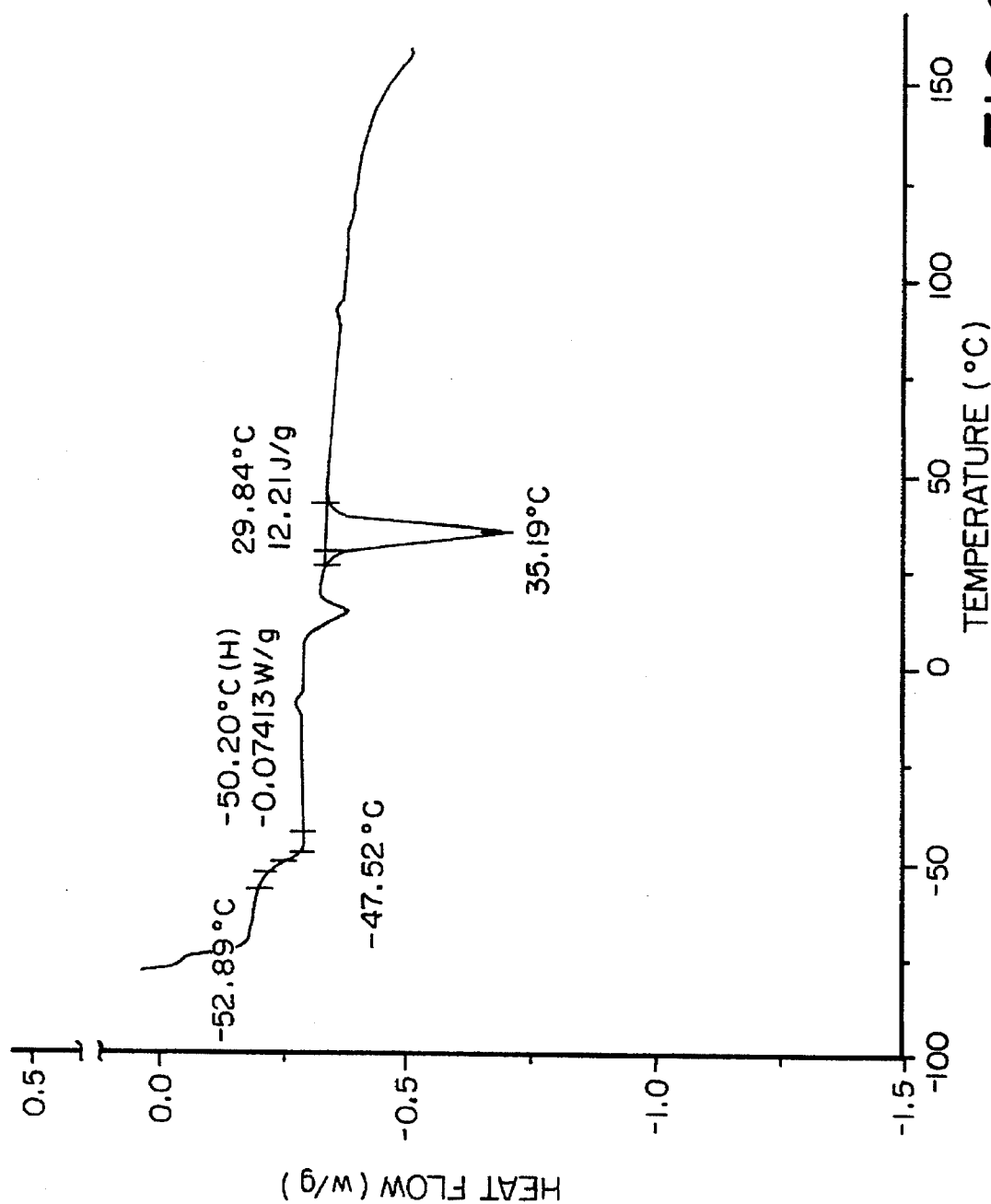
FIG. 9b is a plot of heat flow versus temperature for the electrolyte of Example 14 showing the sharp reduction of crystallinity by the addition of lithium perchlorate in a ratio of 10:1 lithium:PEO oxygen ratio.

The product of Example 9 (60.0 g) was added to a mixer and heated to 60° C. resulting in a brown liquid. Lithium perchlorate (14.3 g, 10:1 Li: dendrimer PEO oxygen ratio) was added and the mixture agitated for three hours after which all of the salt had dissolved. The mixture was cooled to room temperature. Two samples were removed and 3% and 10% 3:1 ethylene carbonate/propylene carbonate was added respectively. The conductivities (FIG. 10) were measured by a Stonehart Associates Potentiostat BC 1200, a Solartron 1250 Frequency Response Analyzer using blocking electrodes. Differential Scanning Calorimetry (DSC) thermograms showed that the dendrimer without salt had a sharp melting endotherm of 111 J/g at 35° C. as shown in FIG. 9a. With the salt the melting endotherm was reduced (12 J/g) as shown in FIG. 9b. A high degree of crystallinity is shown by the sharp melting endotherm of 111 J/g as shown in FIG. 9a. The sharp reduction of crystallinity by the addition of lithium perchlorate in ratio of 10:1 lithium:PEO oxygen ratio is shown in FIG. 9b. Conductivity as a function of temperature of the solvent less dendrimer after the addition of lithium perchlorate in a ratio of 10:1 lithium:PEO oxygen ratio (Curve A), as well as the same electrolyte with additions of 3% (Curve B) and 10% (Curve C) of 3:1 mixtures of ethylene carbonate/propylene carbonate is shown in FIG. 10. These data show that the macromolecular materials of this invention can be used as electrolytes for electrochemical cells.

Dendrimers that were synthesized with a DP=10 to 40 had melting points of 17° C. to 44° C. with the general trend that higher DP gave higher melting points. Dendrimers that were synthesized with a DP=80 to 120 had melting points of 35° C. to 44° C. The melting points of each dendrimer showed variations of up to 10° C. For example, the product of the reaction of Example 6 (approximate theoretical molecular weight=41,000) showed a melting endotherm of 40° C. on the first DSC scan. This dendrimer had been precipitated from solution. After cooling the specimen crystallized from the melt and the second scan showed a melting endotherm of 49° C. This suggests that the crystal form in highly dependent on the crystallizing condition. Nevertheless, all of the dendrimers showed a lower melting point than PEG polymers of similar molecular weight. For example, PEG-4000 (molecular weight=4000) has a melting point of 62° C. and higher molecular weight PEG's and PEO's have melting points ranging from 62° C.–71° C. The dendrimers had theoretical molecular weights of up to 130,000. Not only did the dendrimers have much lower melt points than PEG's of the same weight but the crystallinity can be highly suppressed by the addition of a salt as lithium perchlorate. For example, PEG-4000 with a 10:1 lithium perchlorate per oxygen ratio is highly crystalline at room temperature while the product of the reaction of Example 7 with a similar ratio of lithium perchlorate is a relatively non-viscous liquid. DSC scans showed little crystallinity and a pronounced glass transition, proving that the mixture is mostly amorphous.

Preferably, the electrolyte of this invention will have a conductivity at about 24° C. of greater than $10^{-6}$ S/cm and more preferably greater than $10^{-5}$ S/cm. The molecular weight of the polymeric macromolecular material of the present invention will generally exceed about 1500 and will preferably fall within a range from about 50,000 to about 500,000 and more if cross-linked.

Figure 5:
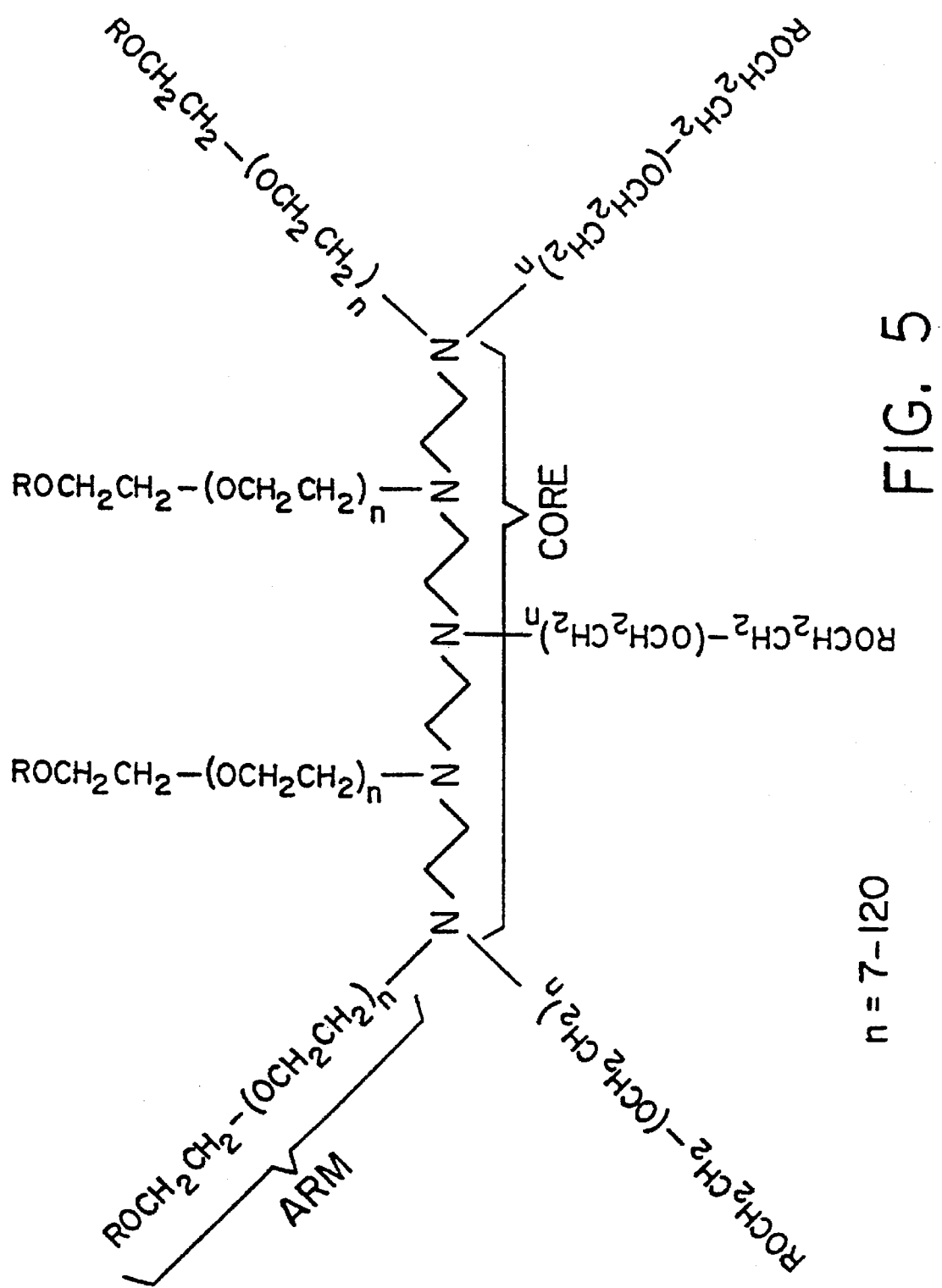
FIG. 5—Dendrimer structure of ethoxylated pentamine where R is H, $CH_3$, Li, Na and the like and DP is from 7 to 120.
Figure 6:
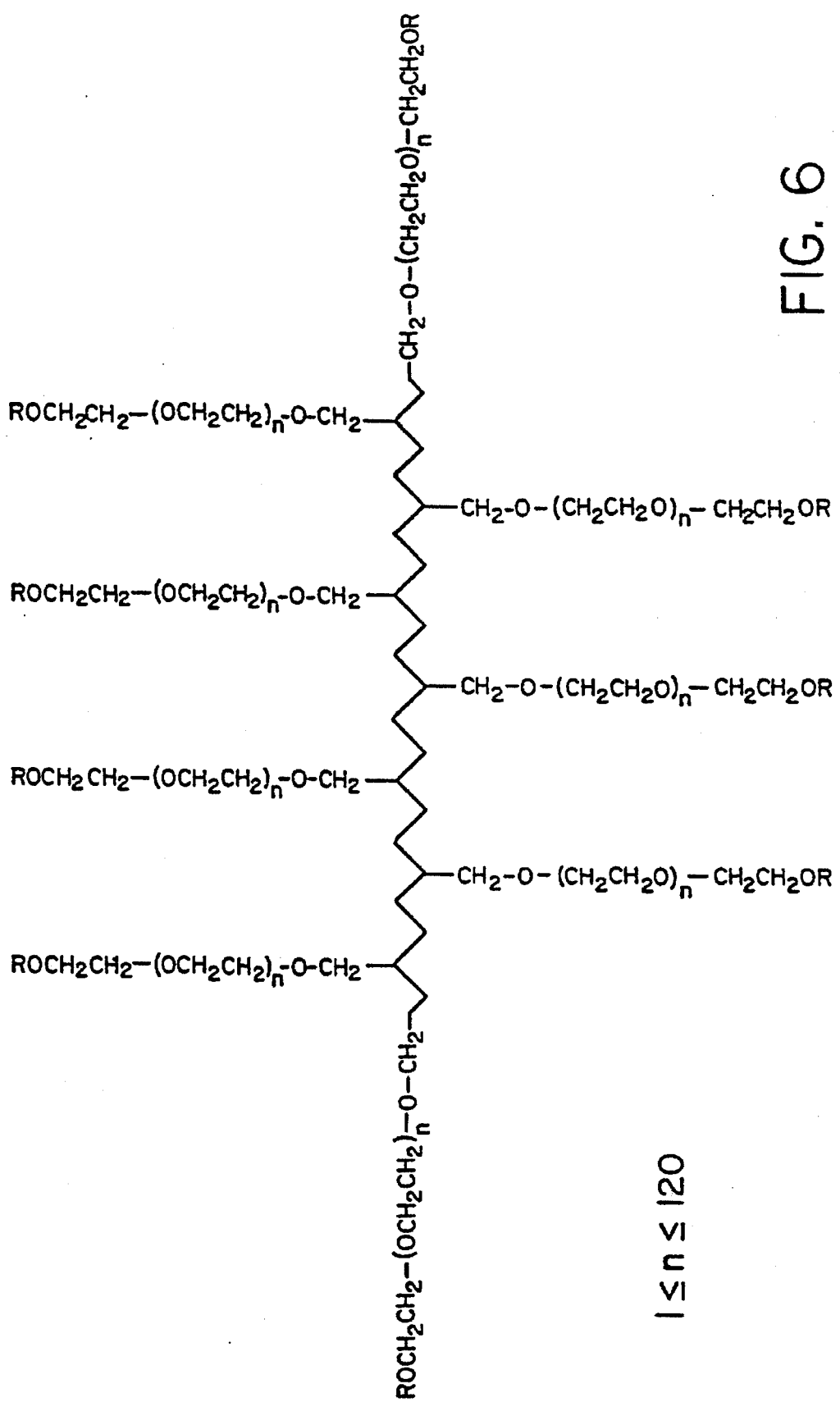
FIG. 6—Star Dendrimer structure of ethoxylated polyallyl alcohol where R is H, $CH_3$, Li and the like and DP is from 1 to 120.
Figure 7:
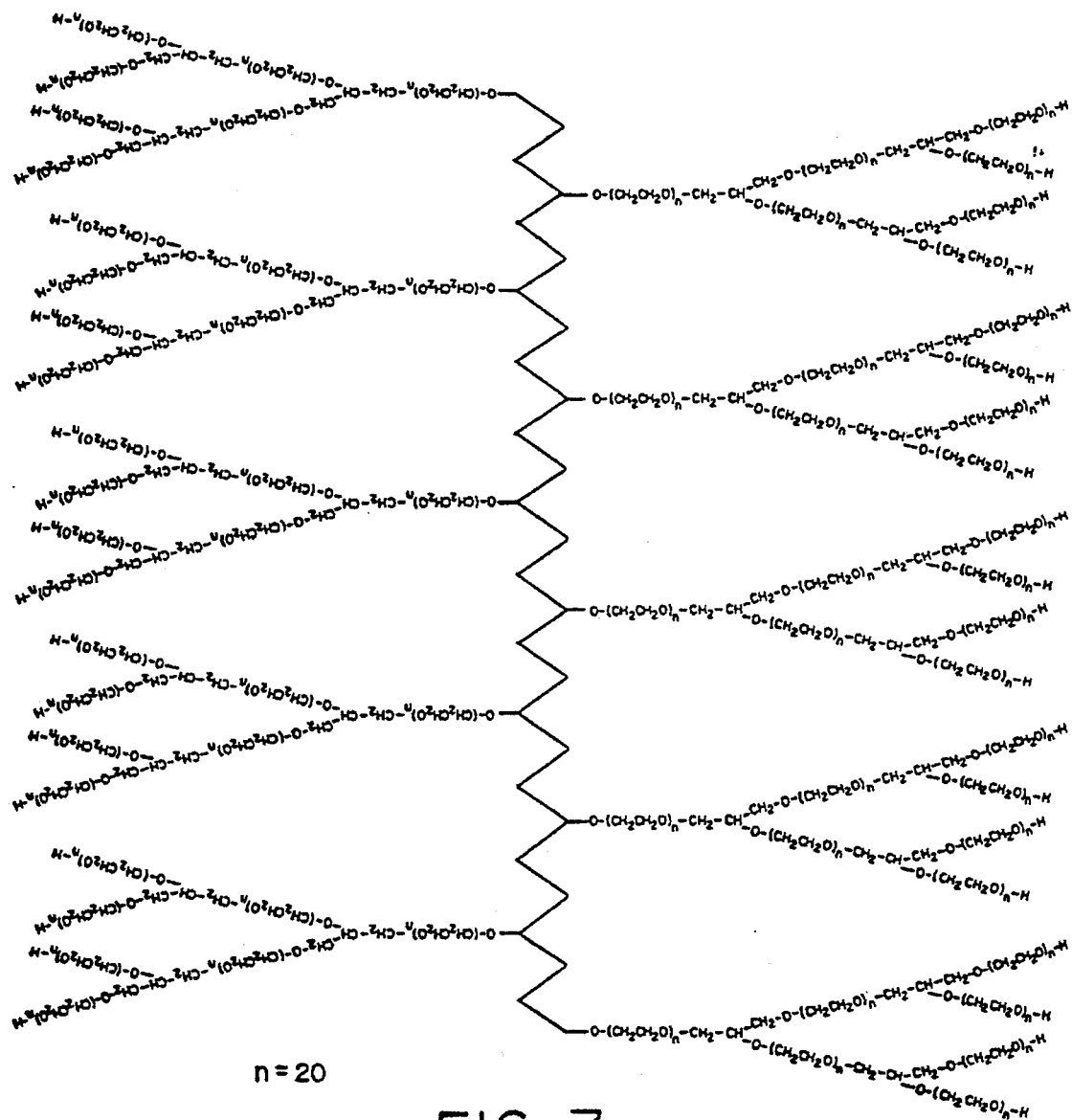
FIG. 7—Starburst Dendrimer structure of ethoxylated polyallyl alcohol with DP=20.

Examples of suitable polymeric macromolecular materials for use in the practice of the invention are as follows:

1. Ethoxylated triethanolamine having the structure shown in FIG. 4.
2. Ethoxylated pentamine having the structure shown in FIG. 5.
3. Ethoxylated polyallyl alcohol having the structure shown in FIG. 6.
4. Ethoxylated polyalkyl alcohol having the structure shown in FIG. 7.
5. Ethoxylated polyamine.
6. Ethoxylated polyols.
7. Ethoxylated polysaccharides.
8. Ethoxylated polyserine.
9. Ethoxylated polyvinylsalcohol.
10. Ethoxylated polyglycerine.
11. Ethoxylated reduced polysaccharides.

Suitable positively charged ionic species for the invention can be selected from the group consisting of $Li^+$, $Na^+$, $K^+$, $Cs^+$, $Rb^+$, $R_4N^+$, $Mg^{2+}$, $Ca^{2+}$ and the corresponding negatively charged ionic species can be selected from the group consisting of halides, $CF_3SO_3^-$, $ClO_4^-$, $AsF_6^-$, $PF_6^-$, methides, bisperhalocyl- or sulfonyl-immides, $BF_4^-$, $SCN^-$, $OOCR'^-$, wherein R' is selected from the group consisting of alkyl, alkenyl, alkynyl, and aromatic.

A suitable cathode material for use in this invention can contain an active cathode material such as manganese dioxide ($MnO_2$), carbon monofluoride, oxides of vanadium such as vanadium pentoxide, metal chromate such as silver chromate and silver bismuth chromate and silver vanadium chromate; metal oxide such as nickel oxide, lead oxide, bismuth lead oxide and copper oxides; sulfides such as copper sulfides and iron sulfides; lithiated metal oxides of such metals as manganese, cobalt, nickel, electronically conductive polymers such as polyaniline, polypyrrole polyacetylene, and cadmium. A carbonaceous material, if used, should preferably be carbon. The preferred carbonaceous material is acetylene or furnace black.

Suitable anodes for use with this invention in an electrochemical cell include lithium, lithium alloys, other alkali and alkaline-earth metals such as sodium, potassium, calcium or magnesium and materials capable of insertion or intercalation of the above such as $WO_2$, graphite or graphitized carbon. The preferred are lithium and lithium alloys with materially capable of inserting or intercalating lithium.

The electrolyte cell may be encapsulated in various laminates to provide additional protection for the cell. However, if the cell is encapsulated in a film such as a polyamide, mylar or metalized polyethylene film, then provisions should be made so that electrical contact can be made from outside the cell to the conductive terminals of the cell. This could be accomplished by providing an opening in the film thereby exposing a selected area of each of the conductive terminals.

A suitable conductive terminal sheet for use in this invention could be copper, nickel, stainless steel or the like, with copper being the preferred current collector. Preferably the thickness of the conductive terminal for most flat cell applications could be from 0.0005 to 0.05 inch thick.

EXAMPLE OF POLYMER ELECTROLYTE CELLS

EXAMPLE 15

A sample cell was made using a 3 mil thick sheet of lithium as the anode, a cathode composed of: 8.55 mg. grams of manganese dioxide and 2 grams of carbon and an electrolyte composed of: 0.2 grams of reaction product of Example 5 and 0.05 grams of a lithium salt, $LiClO_4$.

The cell was assembled with the electrolyte dispersed between the anode and cathode along with a separator. A copper sheet was disposed over the anode and a copper sheet was disposed over the cathode. The cell was tested and found to have an open circuit voltage of 3.2 volts. The cell was discharged across a 27-ohm load and delivered an output of 2.88 milliampere hours.

It is to be understood that modifications and changes to the preferred embodiment of the invention herein described can be made without departing from the spirit and scope of the invention as defined in the appendix claims.

What is claimed:

1. An electrolyte for use in electrochemical cells comprising at least one positively charged ionic species dissolved in a macromolecular material, said macromolecular material comprising an oligomer or polymer having a branched dendrimer structure comprising a polymeric or nonpolymeric core with at least three linear or branched polymeric arms attached to and extending from said core with the ratio of the mean molecular weight of an individual arm to the molecular weight of the core being greater than one, and the number of core repeat units per branch point on the core being less than 25.

2. The electrolyte of claim 1 wherein said macromolecular material is further crosslinked or incorporated into extended polymer structures as a copolymer.

3. The electrolyte of claim 1 wherein the number of core repeat units per core branch point is 1 to 20.

4. The electrolyte of claim 3 wherein the number of core repeat units per core branch point is 1 to 4.

5. The electrolyte of claim 1 wherein said arms comprise linear polymer chains.

6. The electrolyte of claim 1 wherein at least one of said arms contain at least one further branching and contains at least two branch points.

7. The electrolyte of claim 1 wherein said macromolecular material is selected from the group of dendrimers each of whose arms contain at least one polar entity capable of complexing or solvating the ionic species.

8. The electrolyte of claim 7 wherein said macromolecular material is selected from the group of dendrimers each of whose arms contain at least one polar entity capable of complexing or solvating ionic species per polymer repeat unit.

9. The electrolyte of claim 1 wherein said arms are aliphatic arms which contain heteroatom units selected from the group consisting of oxygen, nitrogen, sulfur, phosphorus, siloxanes, and mixtures or alloys thereof, and wherein said heteroatom units are bonded only to carbon atoms.

10. The electrolyte of claim 9 wherein said macromolecular material contains aliphatic cores and said cores contain heteroatom units selected from the group consisting of oxygen, nitrogen, sulfur, phosphorus, siloxanes and mixtures or alloys thereof and wherein said heteroatom units are bonded only to carbon atoms.

11. The electrolyte of claim 10 in which the core contains nitrogen and the arms contain oxygen.

12. The electrolyte of claim 1 wherein said macromolecular material is selected from the group of dendrimers wherein the number of polymer repeat units in the arm segments is greater than four.

13. The electrolyte of claim 12 wherein said macromolecular material is selected from the group of dendrimers wherein the number of polymer repeat units in the arm segments is greater than ten.

14. The electrolyte of claim 10 wherein said macromolecular material is selected from the group of dendrimers wherein the number of polymer repeat units in the arm segments is greater than twenty.

15. The electrolyte of claim 1 wherein said macromolecular material is selected from the group consisting of ethoxylated polyethyleneimine, ethoxylated polyamine, ethoxylated polyallylalcohol, ethoxylated polyols, ethoxylated polysaccharides, ethoxylated polyserine, ethoxylated polyvinylalcohol, ethoxylated polyglycerine, ethoxylated triethanolamine, and ethoxylated reduced polysaccarides.

16. The electrolyte of claim 1 wherein the said positively charged ionic species is selected from at least one of the group consisting of $Li^+$, $Na^+$, $K^+$, $R'_4N^+$, $Mg^{2+}$, $Ca^{2+}$, and further comprising a negatively charged ionic species selected from at least one of the group consisting of $CF_3SO_3^-$, $ClO_4^-$, $AsF_6^-$, $PF_6^-$, methides, bisperhaloacyl- or sulfonyl-immide, $BF_4^-$, $SCN^-$, and $OOCR^-$ wherein R is selected from the group consisting of alkyl, alkenyl, alkynyl and aromatic.

17. The electrolyte of claim 1 containing a plasticizer selected from the group consisting of ethylene carbonate, propylene carbonate, y-butyrolactone, n-methylpyrolidone, methylformate, dimethyl carbonate, diethyl carbonate, tetrahydrofuran, 2Me-THF, and polyethylene glycols.

18. A macromolecular material comprising an oligomer or polymer having a branched dendrimer structure comprising a polymeric or nonpolymeric core with at least three linear or branched polymeric arms attached to and extending from said core with the ratio of the mean molecular weight of an individual arm to the molecular weight of the core being greater than one; the number of core repeat units per branch point on the core being less than 25; the number of polymer repeat units in an arm segment is greater than 4 but less than 500; and at least one arm containing at least two branch points; where said macromolecular material may be further crosslinked or incorporated into extended polymer structures as a copolymer; wherein said core and arms are aliphatic; and wherein said arms each contain at least one polar entity capable of complexing or solvating ionic species.

19. The macromolecular material of claim 18 wherein said polymeric arms each contain at least one polar entity capable of complexing or solvating ionic species per polymer repeat unit.

20. The macromolecular material of claim 18 wherein arms comprise linear polymer chains.

21. The macromolecular material of claim 20 wherein said polar entity consists of at least one heteroatom specie selected from the group oxygen, nitrogen and sulfur, and said heteroatom being incorporated into the polymer chain by direct bonding with carbon atoms only.

22. The macromolecular material of claim 18 wherein the core repeat units per core branch is 1 to 20.

23. The macromolecular material of claim 22 wherein the core repeat units per core branch unit is 1 to 4.

24. The macromolecular material of claim 18 wherein the arm containing at least two branch points contains at least one further branch point.

25. The macromolecular material of claim 18 wherein said cores contain heteroatom units selected from the group consisting of oxygen, nitrogen, sulfur, phosphorus, siloxanes and mixtures or alloys thereof, and wherein said heteroatom units are bonded only to carbon atoms.

26. The macromolecular material of claim 18 having more than 10 repeat units per segment and less than 500.

27. The macromolecular material of claim 18 being more than 20 repeat units per segment and less than 500.

28. The macromolecular material of claim 18 wherein said macromolecular material is selected from the group of dendrimers consisting of ethoxylated polyethylenimine; ethoxylated triethanolamine, ethoxylated polyamine, ethoxylated polyallylalcohol, ethoxylated polyols, ethoxylated polysaccharides, ethoxylated reduced polysaccharides, ethoxylated polyglycerine, ethoxylated polyserine and ethoxylated polyvinylalcohol.

29. The electrolyte of claim 1 wherein the polymer is a copolymer.

30. The macromolecular material of claim 18, wherein the polymer is a copolymer.

31. An electrolyte for use in electrochemical cells comprising at least one positively charged ionic species dissolved in a macromolecular material, said macromolecular material comprising an oligomer or polymer having a branched dendrimer structure comprising a polymeric or non-polymeric core with at least three linear or branched polymeric arms attached to and extending from said core with the ratio of the mean molecular weight of an individual arm to the molecular weight of the core being greater than one, the number of core repeat units per branch point on the core being less than 25, the mean number of polymer repeat units on an arm segment is 500 or less and at least one of the polymeric arms contains at least two branch points.

* * * * *